United States Patent [19]
Abramson

[11] Patent Number: 5,951,667
[45] Date of Patent: Sep. 14, 1999

[54] METHOD AND APPARATUS FOR CONNECTING EXPANSION BUSES TO A PERIPHERAL COMPONENT INTERCONNECT BUS

[75] Inventor: Darren Abramson, Folsom, Calif.

[73] Assignee: Intel Corporation, Santa Clara, Calif.

[21] Appl. No.: 08/778,192

[22] Filed: Jan. 2, 1997

[51] Int. Cl.[6] .................................................. G06F 13/00
[52] U.S. Cl. ......................................... 710/129; 710/107
[58] Field of Search ................................... 395/308, 309, 395/287, 299–305

[56] References Cited

U.S. PATENT DOCUMENTS

| | | | |
|---|---|---|---|
| 5,555,383 | 9/1996 | Elazar et al. | 395/306 |
| 5,675,794 | 10/1997 | Meredith | 395/651 |
| 5,748,911 | 5/1998 | Maguire et al. | 395/281 |

*Primary Examiner*—Ayaz R. Sheikh
*Assistant Examiner*—David A. Wiley
*Attorney, Agent, or Firm*—Blakely, Sokoloff, Taylor & Zafman

[57] ABSTRACT

Modern personal computers often have several internal buses. An integrated expansion bus bridge is disclosed that couples to a fast main computer bus and couples several different expansion buses to the fast main computer bus. In one personal computer embodiment, the fast main computer bus bus is the Peripheral Component Interconnect (PCI) Bus. The expansion bus bridge obains control of the PCI bus and then arbitrates the bus control among several entities requesting access to the PCI bus. In one personal computer embodiments, the entities requesting access to the PCI bus include a Universal Serial Bus (USB) controller, an Industry Standard Architecture (ISA) bus controller, and an Integrated Drive Electronics controller. To prevent deadlock situations, the integrated expansion bus controller passively releases the PCI Bus when an ISA Direct Memory Access (DMA) operation is in progress. A passive release of the PCI bridge prevents CPU postings to or behind the expansion bus bridge from occurring. If no ISA DMA operation is in progress, then the expansion bus bridge may actively release the PCI bus.

15 Claims, 8 Drawing Sheets

BMIDE Transfer
24 bytes written

METHOD AND APPARATUS FOR CONNECTING EXPANSION BUSES TO A PERIPHERAL COMPONENT INTERCONNECT BUS

FIELD OF THE INVENTION

This invention relates to the field of computer bus systems. Specifically, the invention relates to an arbitration protocol for allowing multiple bus devices to share a single bus access mechanism.

ART BACKGROUND

The performance of personal computer systems has improved as the technology has improved. Most notably, the speed of the central processing systems has greatly increased. To keep up with the increased processing speeds of the microprocessors, computer bus systems have also had to evolve.

The original IBM® personal computer (the IBM PC XT) had a slow 8 bit bus know as the XT bus. The XT bus was abandoned by IBM in their second generation personal computer (PC) known as the IBM® PC AT. The IBM® PC AT had a sixteen bit wide bus known as the AT bus. Soon after the IBM® AT was introduced, a large number of computer makers introduced personal computers that were compatible with the IBM® PC AT. The "IBM®-compatible" computers had a bus that functioned the same as the AT bus.

IBM® then introduced a newer computer bus known as the Microchannel® bus. The IBM® Microchannel® was a proprietary bus and IBM® required royalty payments from any computer maker that implemented the IBM® Microchannel® bus. Instead of adopting the newer Microchannel® bus, the compatible computer manufacturers kept using the older AT bus and renamed it the Industry Standard Architecture (ISA) bus. The Industry Standard Architecture (ISA) bus became a de facto standard for personal computers.

As processor speeds increased, it became apparent that the sixteen bit wide ISA bus was becoming a bottleneck for computer performance. To remedy this situation, new thirty-two bit wide bus standards were proposed including the VESA local bus (VLB) and the Peripheral Component Interconnect (PCI) bus. Both standards were made freely available. The Peripheral Component Interconnect (PCI) bus has become the de facto industry standard.

A large number of peripheral cards still exist for the ISA bus. For example, many sound cards, such as the Sound-Blaster™ (a trademark of Creative Labs, Inc.) sound card that dominates the industry, are ISA based cards. Thus, most computers still contain an ISA bus in order to use such ISA cards. However, the ISA bus is implemented in addition to the more advanced PCI bus. In fact most current computer systems typically have three distinct buses, namely, a processor (host) bus, a Peripheral Component Interconnect (PCI) bus and an Industry Standard Architecture (ISA) bus. The host bus is a very fast bus that is directly connected to the processor (host) of the computer system. The PCI bus is coupled to the host bus through a host bridge. The slow ISA bus is coupled to the PCI bus through an expansion bus bridge.

A new computer bus standard, known as the Universal Serial Bus (USB), is currently being adopted by many computer manufacturers. The Universal Serial Bus (USB) is a bus that allows external peripherals to be added to a computer system. The USB is very simple to use since USB devices are connected together in a simple daisy chain system.

One feature of the Universal Serial bus is the ability to perform isochronous transfers. To perform isochronous transfers properly, the Universal Serial Bus requires guaranteed access to the computer memory. Thus, it would be desirable to have an efficient method of adding the Universal Serial Bus (USB) to personal computer systems that will supply the guaranteed access.

Furthermore, it is very desirable to keep the number of integrated circuit parts needed for a personal computer low. This can be accomplished by combining several different functions into a single integrated circuit. Nearly every IBM®-compatible personal computer uses an external device interface known as the Integrated Drive Electronics (IDE) interface. The IDE interface is used to connect hard disk drives and CD-ROM devices to the computer system. Thus, it would be also be desirable to integrate an IDE interface controller with a USB interface controller.

SUMMARY OF THE INVENTION

An integrated expansion bus bridge is disclosed. The expansion bus bridge is coupled to a fast main computer bus. The integrated expansion bus controller couples several different expansion buses to the main computer bus. In one embodiment, the integrated expansion bus controller couples a Universal Serial Bus (USB) host controller, an Industry Standard Architecture (ISA) bus controller, and an IDE controller to a Peripheral Component Interconnect (PCI) Bus. To prevent deadlock situations, the integrated expansion bus controller passively releases the Peripheral Component Interconnect (PCI) Bus when an ISA Direct Memory Access (DMA) operation is in progress. A passive release of the PCI bridge prevents CPU postings from occurring. If no ISA Direct Memory Access (DMA) operation is in progress, then the expansion bus bridge actively releases the PCI bus.

Other features and advantages of the present invention will be apparent from the accompanying drawings, and from the detailed description that follows below.

BRIEF DESCRIPTION OF THE DRAWINGS

The features and advantages of the present invention will be apparent to one skilled in the art, in view of the following detailed description and drawings in which.

DETAILED DESCRIPTION OF THE INVENTION

Methods and apparatus for implementing an integrated expansion bus arbiter are disclosed. In the following description, for purposes of explanation, specific nomenclature is set forth to provide a thorough understanding of the present invention. However, it will be apparent to one skilled in the art that these specific details are not required in order to practice the present invention. Well known circuits and devices are shown in block diagram form.

The Universal Serial Bus

To gain greater acceptance by consumers, personal computers still need to become easier to configure and operate. One particularly frustrating area for consumers is the addition of new peripherals to a computer system using the existing ISA and PCI buses. To add a peripheral that connects to the ISA or PCI bus, the user must open the case of computer and slide a printed circuit card into a bus slot. Working with the mechanical and electrical components of computers can be very intimidating to average users. An alternative method of personal computer expansion is to use the serial ports and parallel port available on most personal computer systems. However, only one device can be attached to each of such ports.

Thus, an easier method for adding new computer peripherals is needed. Ideally, the new method would be expandable such that many devices could added. To fulfill this goal, the Universal Serial Bus (USB) was developed.

To a user, the Universal Serial Bus takes the physical form of one or more external interface ports on a computer system. To add a new peripheral to the Universal Serial Bus, the user simply plugs the new peripheral into an external Universal Serial Bus interface port. Some Universal Serial Bus peripherals have at least two Universal Serial Bus interfaces such that additional Universal Serial Bus peripherals can be coupled together in a daisy chain. Thus, the Universal Serial Bus provides a easy to use and expandable computer bus. Additional information about the Universal Serial Bus can be found in the Universal Serial Bus Specification, Revision 1.0.

Figure 1:
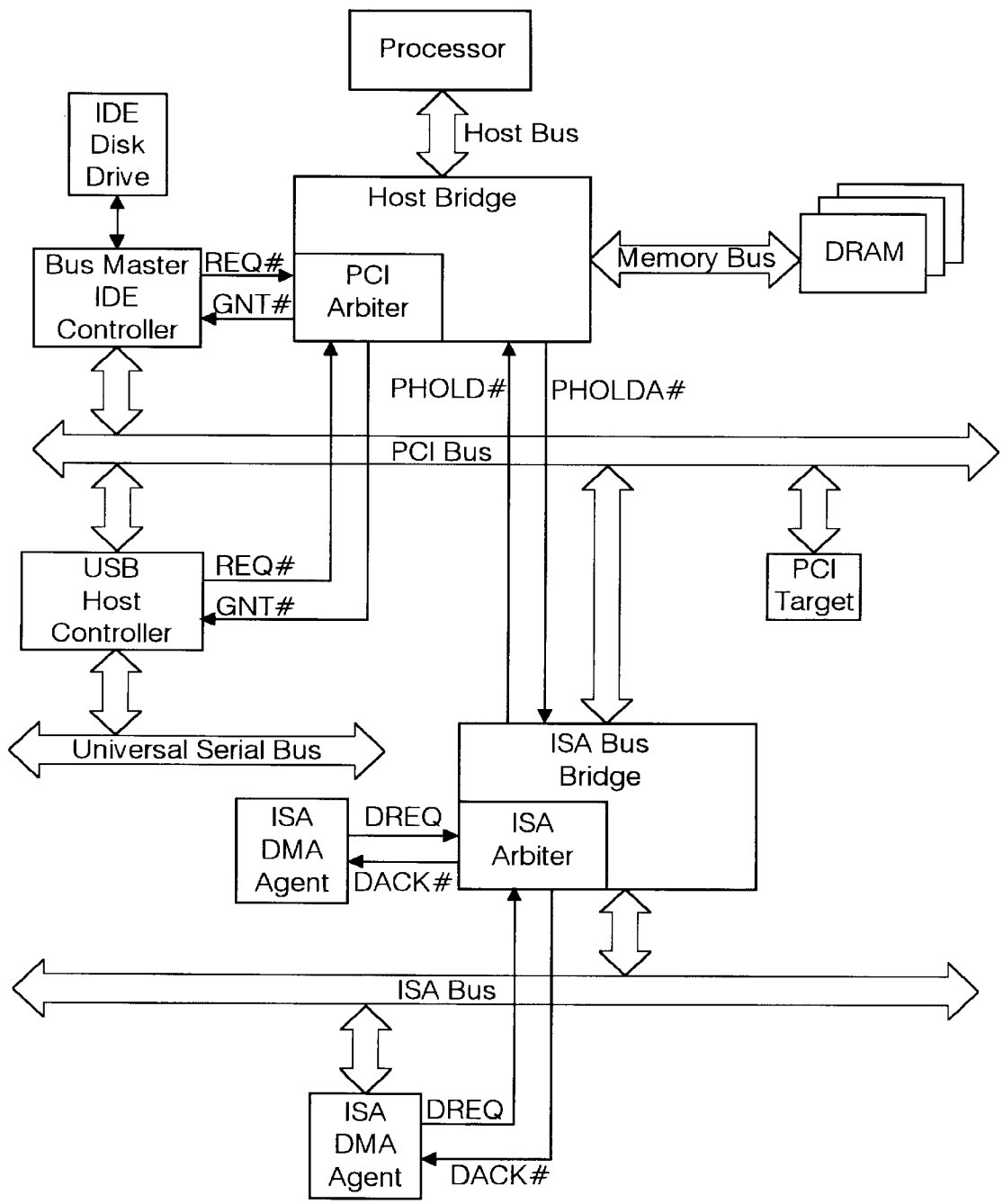
FIG. 1 illustrates a block diagram of a computer system with an IDE controller and a Universal Serial Bus (USB) Host controller coupled directly to the Peripheral Component Interconnect (PCI) bus.

FIG. 1 illustrates a block diagram depicting one possible method of adding the Universal Serial Bus to a personal computer system. In the block diagram of FIG. 1, a Universal Serial Bus host controller 140 is coupled directly to the Peripheral Component Interconnect (PCI) bus 120. The Universal Serial Bus host controller 140 communicates with the main memory and other devices through the Peripheral Component Interconnect (PCI) bus 120.

The method of adding the Universal Serial Bus to a personal computer system illustrated in FIG. 1 is not an ideal solution. One feature of the Universal Serial Bus is the ability to perform isochronous transfers. To perform isochronous transfers properly, the Universal Serial Bus requires guaranteed access to the memory. Specifically, the Universal Serial Bus must be able to access the memory at regular intervals. In the configuration illustrated in FIG. 1, the Universal Serial Bus accesses the computer memory through the Peripheral Component Interconnect (PCI) bus 120. Thus, the Universal Serial Bus would require guaranteed access to the Peripheral Component Interconnect (PCI) bus 120.

The Peripheral Component Interconnect (PCI) bus 120 is a multi-master bus. Each potential bus master must arbitrate for the PCI bus through a PCI bus arbiter. Furthermore, each bus master can be pre-empted by the bus arbiter. Since the Peripheral Component Interconnect (PCI) bus 120 can have several different bus masters and each bus master can be pre-empted, the Universal Serial Bus may not receive the guaranteed access to the main memory through the Peripheral Component Interconnect (PCI) bus 120.

The ISA Bus Connected Directly To The PCI Bus

The ISA bus presented similar problems for computer designers that wished to include the ISA bus in a PCI bus based personal computer system. One problem that occurs with the simple ISA bus protocol is that once a device on the ISA bus is granted access to system memory, the device effectively "locks" out the rest of the computer system. If an ISA bus is connected directly to a PCI bus, then the entire computer system including the PCI bus, the host bus, the CPU and the main memory can be unavailable until the ISA device (agent) has fully completed its transaction.

A reason for this is that the ISA bus is not "pre-emptable" such that ISA devices (agents) cannot be interrupted. Thus, ISA agents can potentially lock out the rest of the computer system indefinitely. This problem is particularly noticeable in the case of a record and playback of full duplex 44.1 KHz audio which have 32-bit samples for record and playback such that the resources of the ISA sound card with only an 8-bit or 16-bit ISA Bus attachment capability are fully taxed. Such an arrangement allows the ISA sound card to tie up the entire system for an unacceptable period of time. Further, since the ISA bus runs at 8 MHz, transactions from the ISA bus over the PCI bus effectively run the PCI bus, as well as the memory bus, also at 8 MHz.

Figure 2:
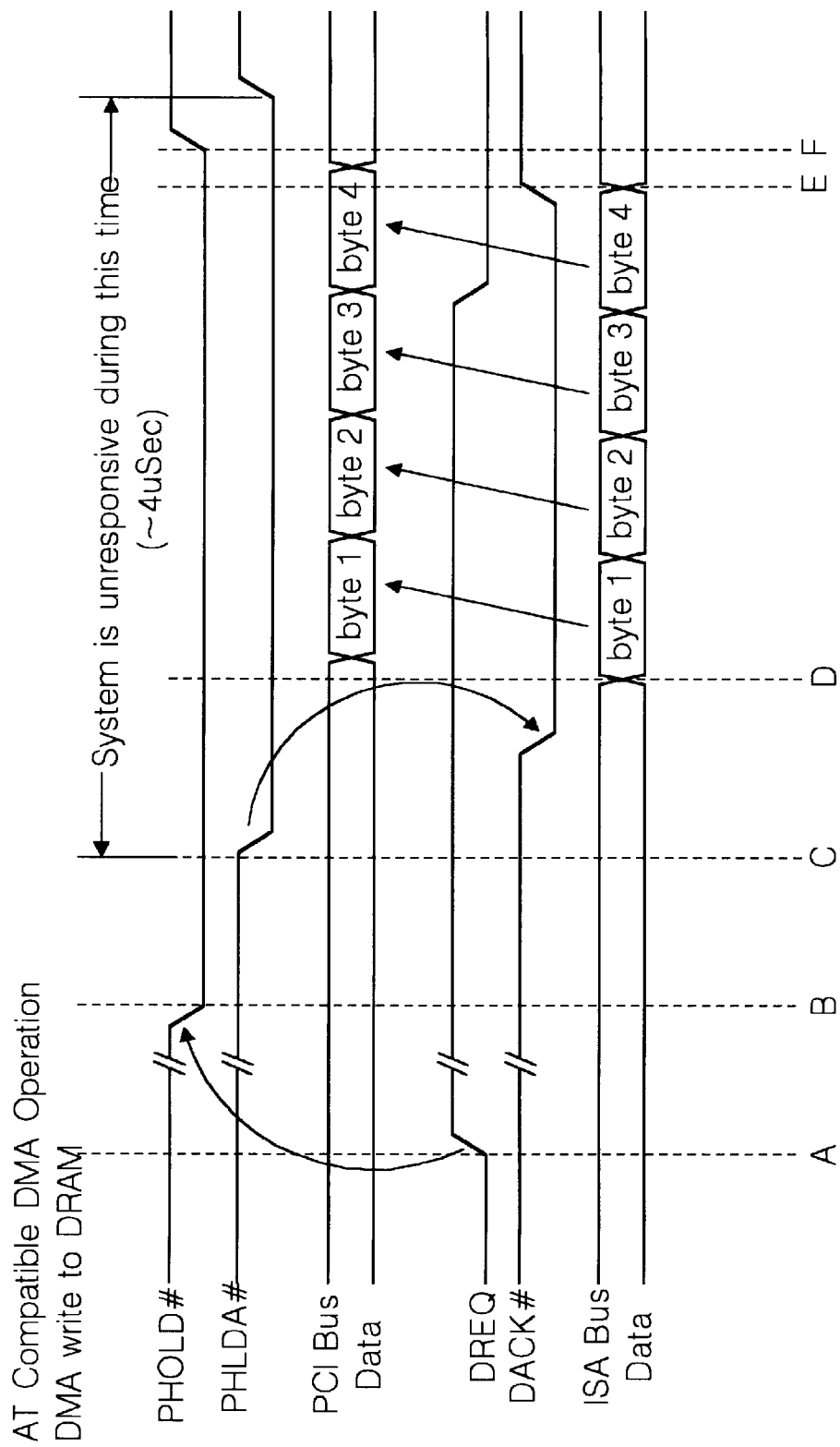
FIG. 2 illustrates a timing diagram example of an direct memory access operation by an ISA agent across an expansion bus coupled to a PCI bus.

FIG. 2 illustrates the system lock problem caused by a ISA bus coupled directly to PCI bus. In the timing diagram of FIG. 2, an ISA Direct Memory Access (DMA) write is illustrated. At time index A, an ISA DMA agent asserts the Direct memory access Request (DREQ) signal thereby requesting a grant of the ISA bus from the ISA bus arbiter. At time index B, which follows time index A, (indicated by looping arrow) the signal PCI bus Hold (PHOLD#) is asserted by an expansion bus bridge that couples the ISA bus to the PCI bus. (The PCI bus Hold (PHOLD#) signal is a sideband PCI signal for obtaining non-pre-emptable control of the PCI bus from the PCI bus arbiter.) The assertion of the PCI bus Hold (PHOLD#) is triggered in response to the Direct memory access Request (DREQ) signal such that the ISA agent can communicate across the PCI bus through the expansion bus bridge.

Assuming that the ISA arbiter has granted access to the ISA agent initiating the Direct memory access Request (DREQ) signal, PCI bus arbitration occurs from time index B to time index C until the expansion bus bridge has won a grant from the PCI arbiter. At time index C, the PCI bus Hold Acknowledge (PHLDA#) is asserted (active low) to the expansion bus bridge indicating that the ISA data stream transaction can begin. (The PCI bus Hold Acknowledge (PHLDA#) signal is a sideband PCI signal from the PCI bus Arbiter acknowledging the grant of the PCI bus to the entity that asserted the PCI bus Hold (PHOLD#) signal.) The assertion of PCI bus Hold Acknowledge (PHLDA#) whereupon the system acknowledges the right of the expansion bus bridge to transact, allows the expansion bus bridge to assert Direct memory access acknowledge (DACK#) at time index D such that the ISA agent can begin its bus transaction.

As shown by FIG. 2 the assertion of PCI bus Hold Acknowledge (PHLDA#) signal ensures that the ISA agent is guaranteed exclusive access of all system resources and assumes that the system can perform no operation other than the ISA transaction from time index C to time index F (when the ISA stream is finished). Assuming an 8 bit (1 byte) ISA agent performing a four byte transaction, the entire system is consumed for approximately 4 microseconds while individual byte segments are sequentially transferred from the ISA data bus to the PCI data bus (time index D to time index E). The PCI bus is therefore bottlenecked at the ISA speed (8MHz) and data transfer capability, and is precluded from making use of its higher speed and better transfer capability. Eventually the ISA agent completes its transaction and de-asserts the Direct memory access Request (DREQ). The expansion bus correspondingly releases the Direct memory access acknowledge (DACK#) at time index E which releases the ISA bus. When the data transfer across the PCI bus is completed, the expansion bus releases the PCI bus Hold Acknowledge (PHLDA#) at time index F thereby releasing the PCI bus.

The ISA Bus Connected To The PCI Bus Using Passive Release

To solve the problem of having the comparatively slow ISA bus monopolize the PCI bus, a system known as "passive release" was designed. A Passive Release system initiates a trade-off by lowering ISA bus utilization efficiency in favor of increasing PCI bus, CPU and main memory utilization efficiency. By partitioning the data stream originating from the ISA bus into segments, wait states can be introduced between the partitioned segments such that the PCI bus, the processor and memory can, in the interim ISA bus wait states, perform other operations.

Figure 3:
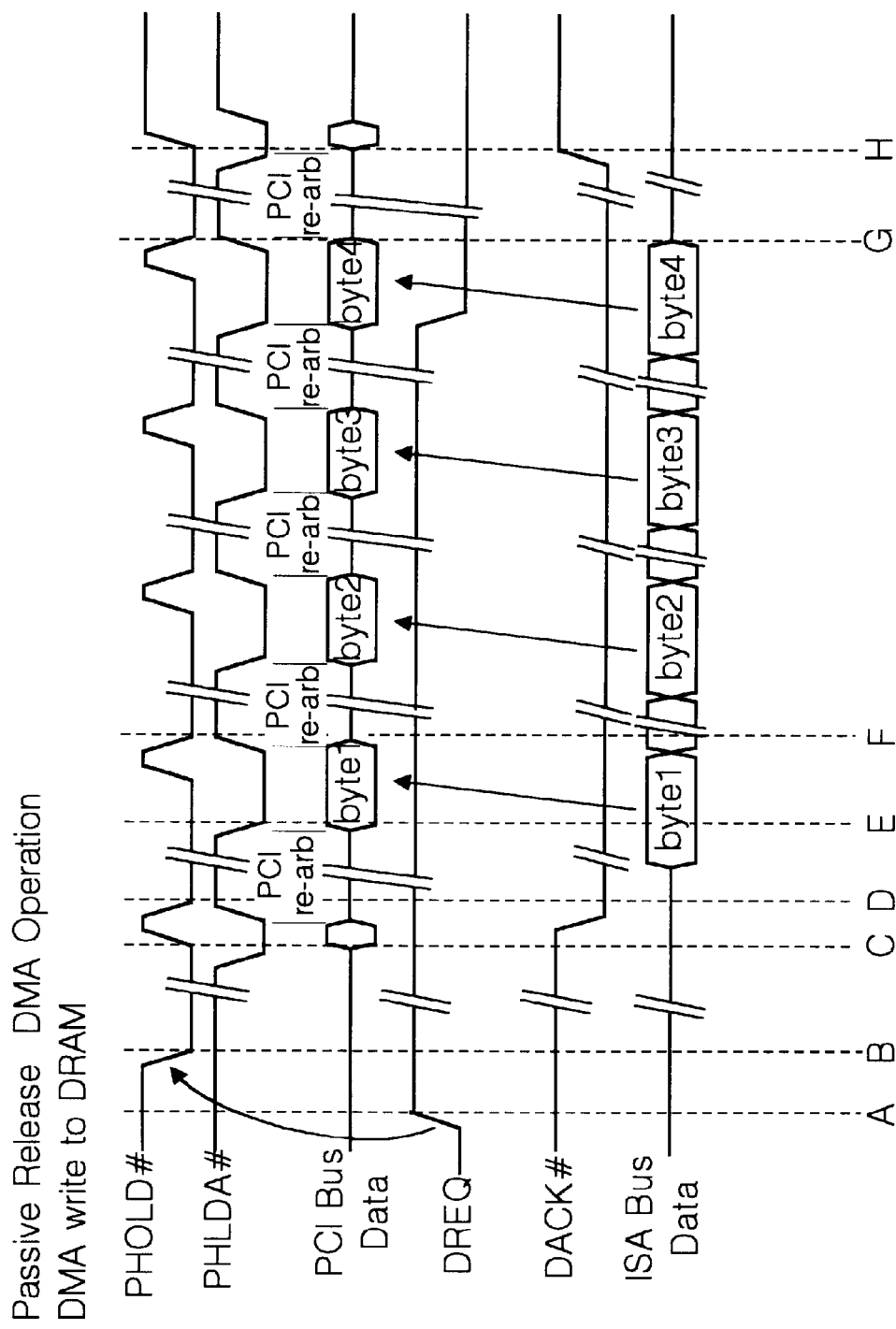
FIG. 3 illustrates a timing diagram example of a direct memory access operation by an ISA agent across an expansion bus coupled to a PCI bus wherein passive release is used.

One example of the passive release access of the PCI bus by an expansion bus bridge that controls the ISA bridge is illustrated with reference to FIG. 3. In the timing diagram of FIG. 3, an ISA agent asserts the Direct memory access Request (DREQ) signal to the ISA arbiter at time index A. In response, the expansion bus bridge asserts the PCI bus Hold (PHOLD#) signal at time index B to obtain control of the PCI bridge.

Upon winning PCI arbitration, the PCI bus Hold Acknowledge (PHLDA#) signal is asserted at time index C. In response, the expansion bus bridge asserts the Direct memory access acknowledge (DACK#) to the ISA Agent. Note that PCI bus Hold Acknowledge (PHLDA#) signal is asserted only following the acquisition of the host bus, memory bus and emptying and disabling of the CPU posting buffer (time index C to D). At this point, the expansion bus bridge releases the PCI bus Hold (PHOLD#) signal since the ISA Agent is not ready for its transaction yet. However, the PCI bus Hold (PHOLD#) signal is only released for a single clock cycle and then it is reasserted.

This single clock cycle release of the PCI bus Hold (PHOLD#) signal is know as a "passive release." This passive release semantic frees the PCI, host and memory buses. However, the passive release ensures that the CPU posting buffer has been drained and disabled from further posting. Further posting may be allowed as long as the expansion bus bridge is not required to complete the cycle. By preventing any CPU posting to or behind the expansion bus bridge, deadlock situations are prevented.

The expansion bus will continually perform the steps of: asserting the PCI bus Hold (PHOLD#) signal, releasing PCI bus Hold (PHOLD#) signal for a single clock cycle (passive release), and then asserting the PCI bus Hold (PHOLD#) signal again until the ISA Agent is ready for its transfer. An example of these repeated one cycle passive releases of the PCI bus Hold (PHOLD#) signal is presented in FIG. 4. It should be noted that when the PCI bus arbiter releases the PCI bus Hold Acknowledge (PHLDA#) in response the one cycle releases of the PCI bus Hold (PHOLD#) signal, other PCI bus masters may obtain control of the PCI bus to execute bus transactions. However, the immediate re-assertion of the PCI bus Hold (PHOLD#) signal ensures that CPU posting to or behind the expansion bus bridge cannot occur thus preventing deadlock.

Figure 4:
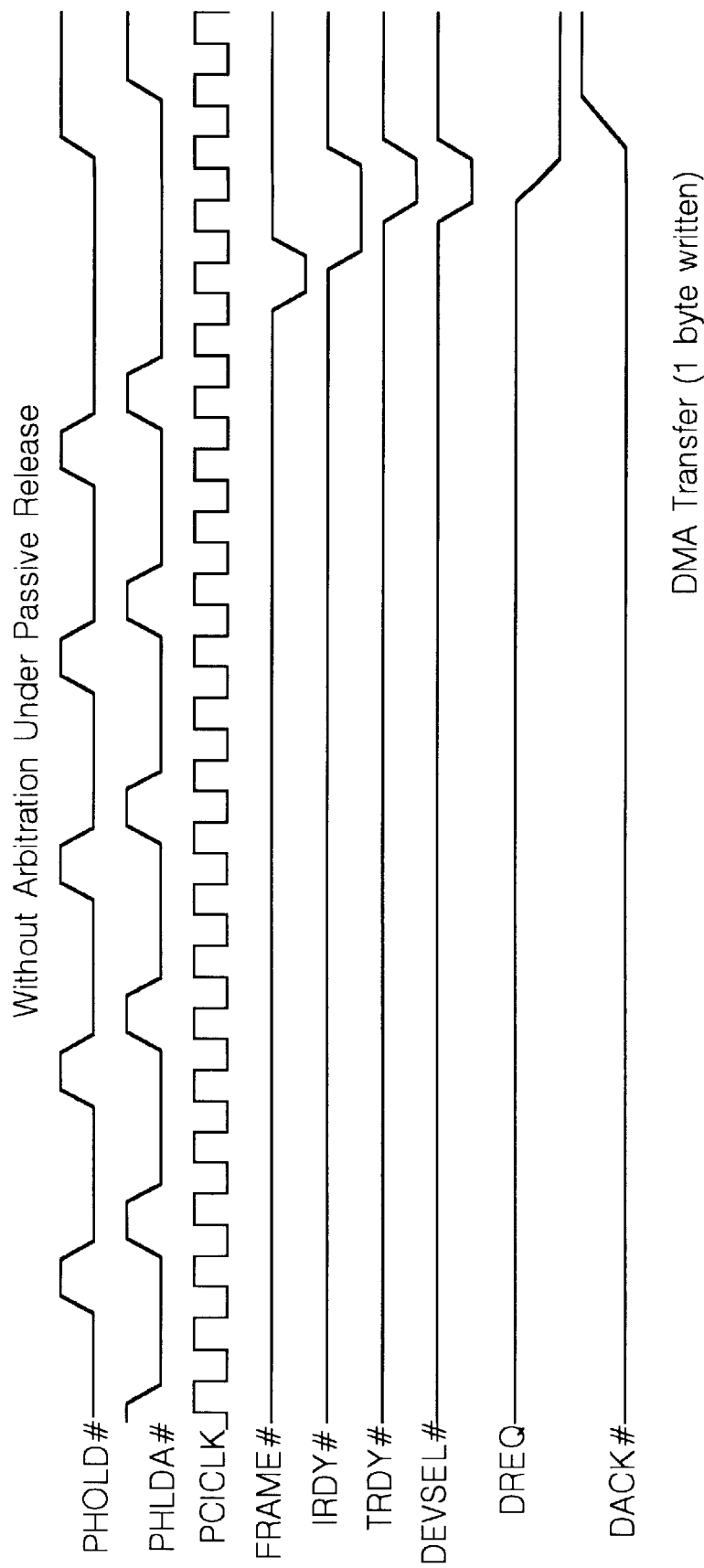
FIG. 4 illustrates another timing diagram example of an direct memory access operation by an ISA agent across an expansion bus coupled to a PCI bus wherein passive release is used.

Referring to FIG. 4, it can be seen that to prevent CPU posting to or behind the expansion bus bridge, the expansion bus bridge continually obtains control of the PCI bus even though the expansion bus bridge is not ready to perform a bus transaction. Thus, the expansion bus bridge wastes PCI bus cycles for the sake of implementing the old ISA bus.

Referring back to FIG. 3, when the ISA Agent is ready for its transfer at time index D, the ISA cycle begins in order to read the first one-byte segment of data from the ISA agent. Between time index D and E, the expansion bus bridge requests the PCI bridge by asserting the PCI bus Hold (PHOLD#) signal. When the expansion bridge wins PCI arbitration at time index E, the expansion bridge writes the first one-byte segment to the PCI bus and then releases the PCI bus Hold (PHOLD#) signal. However, since the data transfer is not complete, the expansion bus bridge reasserts the PCI bus Hold (PHOLD#) signal after the one cycle release. The rest of the data byte transfers occur in the same manner until all four one-byte segments have been transferred across the PCI bus to memory.

When all four bytes have been transferred and the ISA DMA transaction is completed as indicated by ISA Agent releasing its Direct memory access Request (DREQ) signal. The expansion bus desserts the Direct memory access Acknowledge (DREQ) upon winning PCI rearbitration at time index H. After winning PCI arbitration, an "active release" semantic is signaled by the release of PHOLD# for a minimum of two consecutive PCI clock cycles (time index G to H). This active release semantic releases all of the buses and re-enables writes to the CPU posting buffer. A full description of the passive release system can be found in the patent application titled "A collect All Transfers Buffering Mechanism Utilizing Passive Release For a Multiple Bus Environment" filed Jun. 11, 1996 and having Ser. No. 08/661,438.

An Integrated Bus Arbitration Ssytem Using Passive Release

As illustrated in FIG. 4 of the passive release bus transactions, the expansion bus bridge uses the sideband PCI bus Hold (PHOLD#) signal to obtain control of the PCI bus. Furthermore, when the expansion bus bridge is executing a passive release PCI bus transaction, the expansion bus bridge continually obtains control of the PCI bus to prevent CPU postings to or behind the expansion bridge even though no PCI bus transactions occurs. The present invention uses those "wasted" PCI bus cycles by allowing more than one bus controller to access the PCI bus using the PCI bus Hold (PHOLD#) and PCI bus Hold Acknowledge (PHLDA#) signals.

In the embodiment disclosed in this document, the PCI bus Hold (PHOLD#) and PCI bus Hold Acknowledge (PHLDA#) signals are used to couple an ISA bus, a Universal Serial Bus (USB), and an IDE controller to a personal computer system. However, other types of the controllers such as Small Computer System Interface (SCSI) or IEEE.1394 high speed serial controllers could also be connected. Furthermore, other types of computer buses and bus granting mechanisms can be used to obtain control of a principal computer bus.

An Overview

Figure 5:
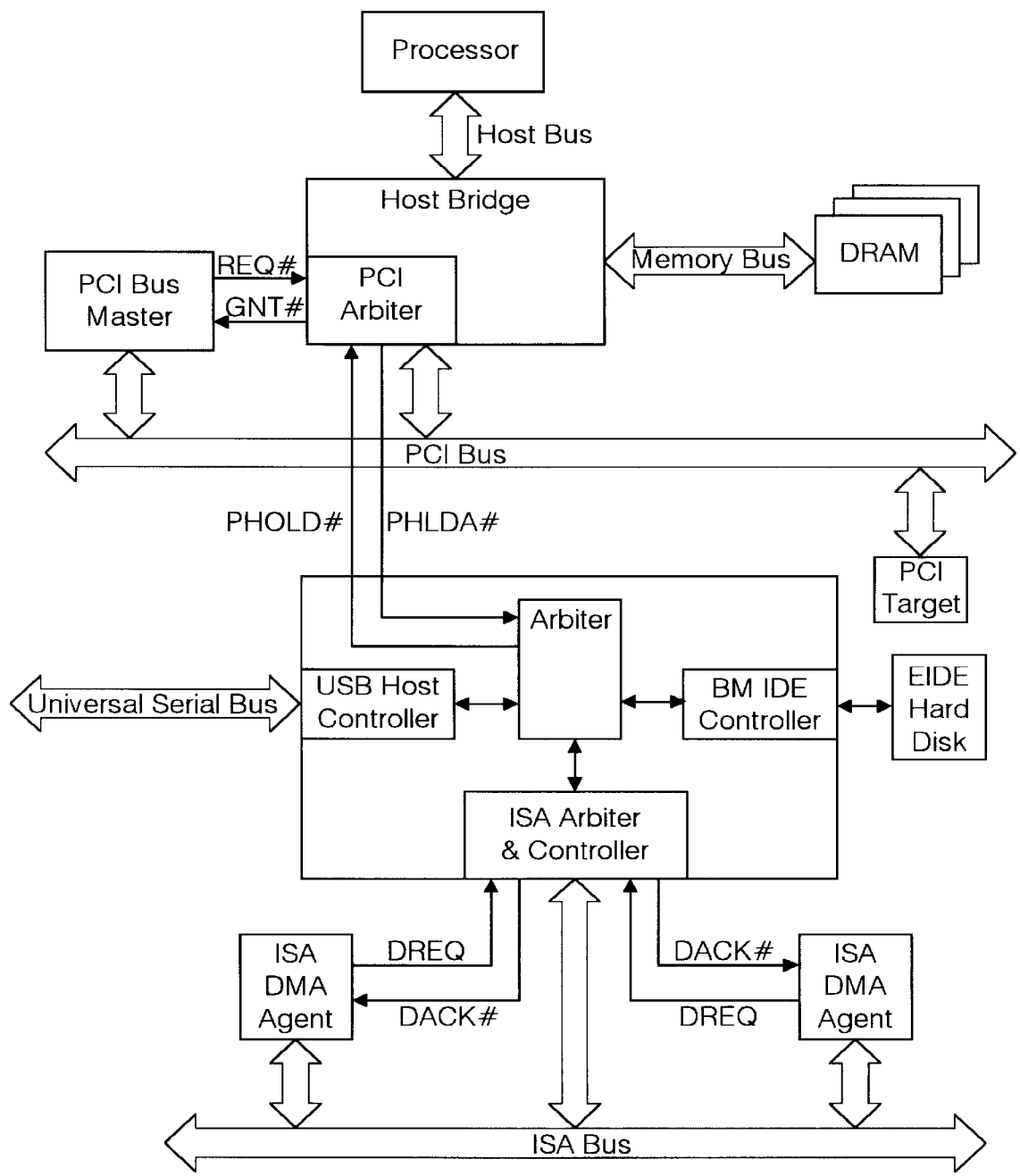
FIG. 5 illustrates a block diagram of computer system wherein an integrated controller allows an Industry Standard Architecture (ISA) bus bridge, a Universal Serial Bus (USB) host controller, and Bus Mastering IDE controller to all arbitrate for the Peripheral Component Interconnect (PCI) bus using the PHOLD# and PHLDA# signals.

Referring to FIG. 5, the present invention introduces an integrated expansion bus controller that uses the sideband PCI bus Hold (PHOLD#) signal to access the PCI bus for several different controllers. Specifically, in the block diagram of FIG. 5 an expansion bus bridge 610 access the PCI bus using the sideband PCI bus Hold (PHOLD#) signal on behalf of a USB host controller 640, an ISA bus controller 670, and a Bus Master IDE controller 680.

Referring to FIG. 5, an expansion bus bridge arbiter 630 in the expansion bus bridge 610 accepts PCI bus access requests from the a USB host controller 640, an ISA bus controller 670, and a Bus Master IDE controller 680. When at least one of the three controllers needs access to the PCI bus, the expansion bus bridge arbiter 630 will assert the PCI bus Hold (PHOLD#) signal in order to obtain control of the PCI bus. However, it should be understood that other bus access mechanisms and other computer buses can be used to implement the teachings of the present invention.

When the expansion bus bridge arbiter 630 obtains control of the PCI bus, the expansion bus bridge arbiter 630 allows one of the three controllers to access the PCI bus to perform a PCI bus transaction. The particular controller that obtains access to the PCI bus depends on the current state of the expansion bus arbiter.

PCI Bus Access Arbitration

When more than one of the three controllers in the expansion bus bridge (USB host controller 640, ISA bus controller 670, and Bus Master IDE controller 680) wish to have access to the PCI bus, then expansion bus arbiter 630 must decide which controller will obtain access to the PCI bus. To make this arbitration decision, the expansion bus arbiter 630 uses a bus priority state machine.

Figure 6:
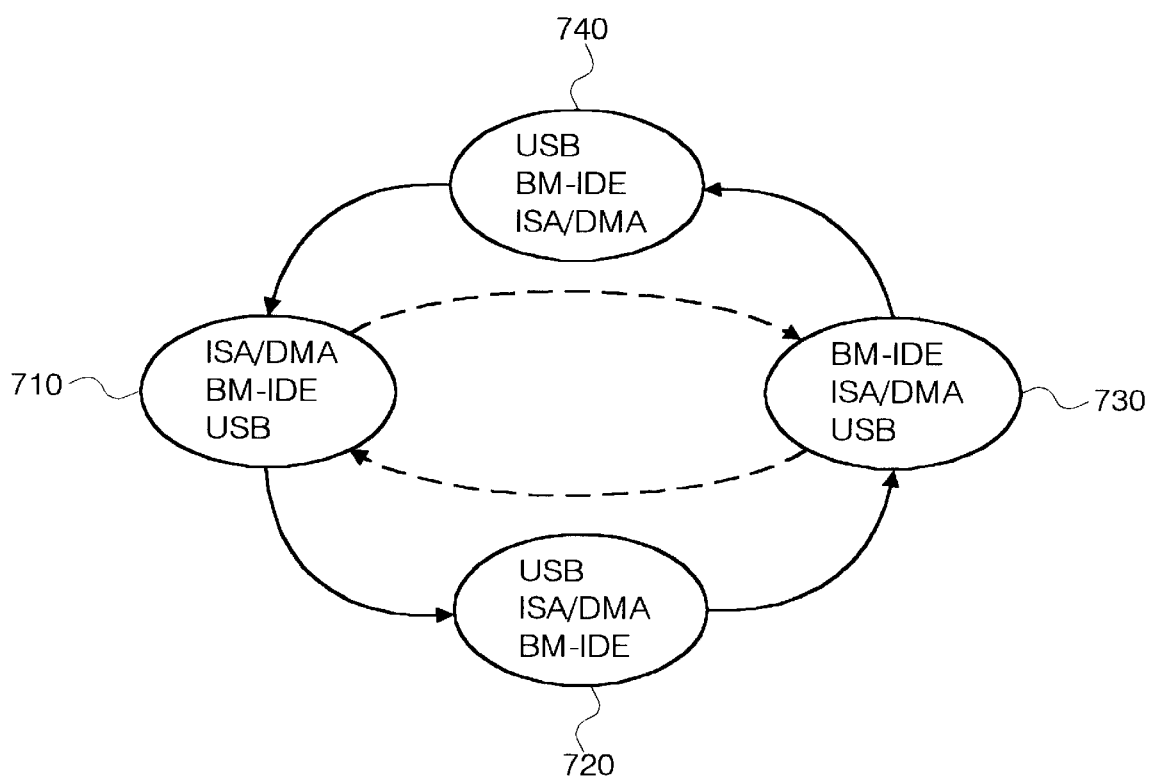
FIG. 6 illustrates a state diagram of bus arbitration priority states in an expansion bus arbiter.

FIG. 6 illustrates a state diagram listing the states of the bus priority state machine. In a full system, the expansion bus arbiter 630 moves between the different states along the solid state transition lines. Each state of the state machine contains a priority list that describes the relative priority for each controller. When an arbitration decision must be made, the expansion bus arbiter 630 selects the controller that has the highest priority. If the controller with the highest priority is not ready to perform a bus transaction, then the controller with the next highest priority is selected.

It should be noted that in the state machine of FIG. 6, two of the states have the Universal Serial Bus (USB) designated as the highest priority controller. By placing the Universal Serial Bus (USB) controller in the highest priority position in two of the four states, the Universal Serial Bus (USB) is ensured guaranteed access to the PCI bus such that isochronous transfers will be performed properly.

Although an ISA bus and an IDE controller are standard equipment in most personal computers, the Universal Serial Bus has not yet become a standard personal computer feature. Thus, many personal computers will not have a functioning Universal Serial Bus (USB) host controller. In such systems, the expansion bus arbiter 630 will simply transition between states 710 and 730 along the dashed state transition lines. In such a configuration, only the ISA bus and the IDE controller will access the PCI bus using the sideband PCI bus Hold (PHOLD#) signal.

The state diagram of FIG. 6 is only one example of an arbitration system for access to the PCI bus through the sideband PCI bus Hold (PHOLD#) signal. It should be noted that additional bus controllers could be added to the expansion bus controller such that a different priority state machine would be used.

An Example Of The Integrated Expansion Bus Bridge Operation

Figure 7:
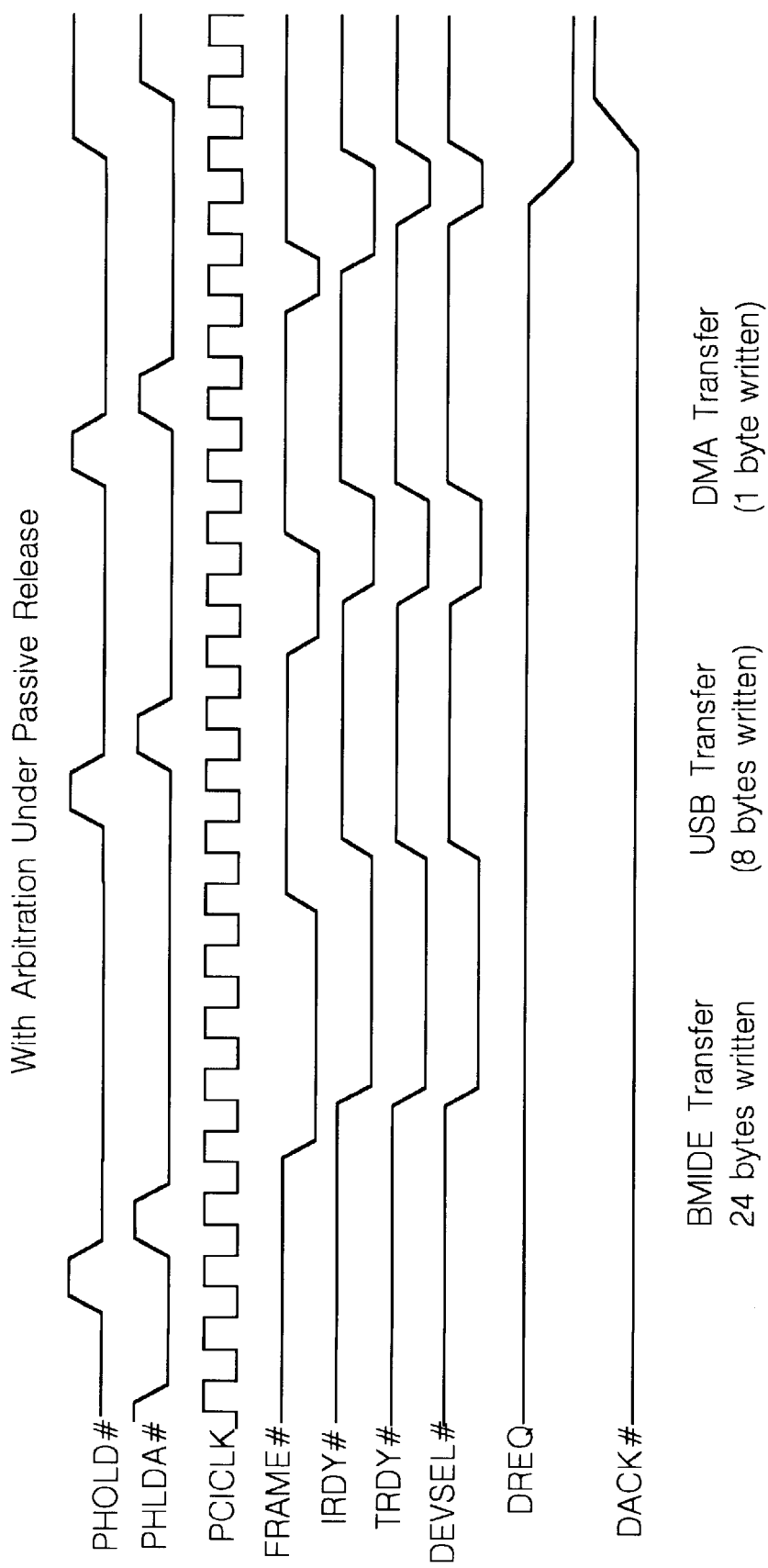
FIG. 7 illustrates a timing diagram example of the integrated expansion bus bridge controller controlling a direct memory access operation by an ISA agent, an access by a USB host Controller, and an access by an IDE controller across a PCI bus.

FIG. 7 illustrates a timing diagram example of the integrated expansion bus bridge in operation. Referring to FIG. 7, an ISA Agent has a Direct Memory Access (DMA) operation already in progress as evidence by the Direct memory access Request (DREQ) and Direct memory access Acknowledge (DACK#) lines being asserted. Furthermore, assume that at the beginning of FIG. 7, the expansion bus arbiter 630 is in state 720.

Since a Direct Memory Access (DMA) operation is in progress, the expansion bus arbiter 630 is in passive release mode where the expansion bus arbiter 630 only releases the PCI bus Hold (PHOLD#) signal for a single clock cycle before reasserting the PCI bus Hold (PHOLD#) signal. Near the beginning of the FIG. 7 timing diagram, the expansion bus arbiter 630 obtains control of the PCI bus since it receives an asserted PCI bus Hold Acknowledge (PHLDA#) signal. Since expansion bus arbiter 630 is in state 720 where the USB controller has highest priority, the USB controller could access the PCI bus. However, at this point the USB has no current need for the PCI bus. Furthermore, neither of the other controllers has any need for the bus such that the PCI bus is passively released (by releasing the PCI bus Hold signal for a single clock cycle). The passive release semantic is used to prevent a CPU posting to or behind the expansion bus bridge that may cause a deadlock situation.

After the PCI bus is passively released, assume that both the USB controller and the IDE controller now need to access the PCI bus. When the expansion bus arbiter 630 next receives an asserted PCI bus Hold Acknowledge (PHLDA#) signal (it receives control of the PCI bus), the expansion bus arbiter 630 moves to state 730. In state 730, the expansion bus arbiter 630 gives priority to the IDE bus controller. Since the IDE controller needs the PCI bus at this point, the IDE executes a transaction on the PCI bus. After the IDE controller completes its bus transaction, the expansion bus arbiter 630 again passively releases the PCI bus such that other devices on the PCI bus can execute PCI bus transactions. Remember that the PCI bus is passively released since there is an ongoing ISA DMA transfer.

After the PCI bus is passively released, assume that ISA bus controller is now ready to access the PCI bus. When the expansion bus arbiter 630 next receives control of the PCI bus, the expansion bus arbiter 630 moves to state 740. In state 740, the expansion bus arbiter 630 gives priority to the USB bus controller. Since the USB controller needs the PCI bus at this point, the USB controller executes its transaction on the PCI bus. After the USB controller completes its bus transaction, the expansion bus arbiter 630 again passively releases the PCI bus such that other devices on the PCI bus can execute PCI bus transactions.

When the expansion bus arbiter 630 next receives control of the PCI bus, the expansion bus arbiter 630 moves to state 710. In state 710, the expansion bus arbiter 630 gives priority to the ISA bus controller. Since the ISA controller is now finally ready to use the PCI bus, the ISA controller executes its PCI bus transaction. After the ISA controller completes its bus transaction, the expansion bus arbiter 630 again releases the PCI bus. Assuming this completes the ISA DMA transaction, the PCI bus will no longer be needed by the ISA bus controller. Since, the ISA bus controller does not need the PCI bus in the foreseeable future, the expansion bus arbiter 630 actively releases the PCI bus by allowing the PCI bus Hold (PHOLD#) signal to be released for at least two clock periods. The active release semantic re-enables CPU postings to or behind the expansion bus bridge.

Active Release When No ISA DMA Is In Progress

Figure 8:
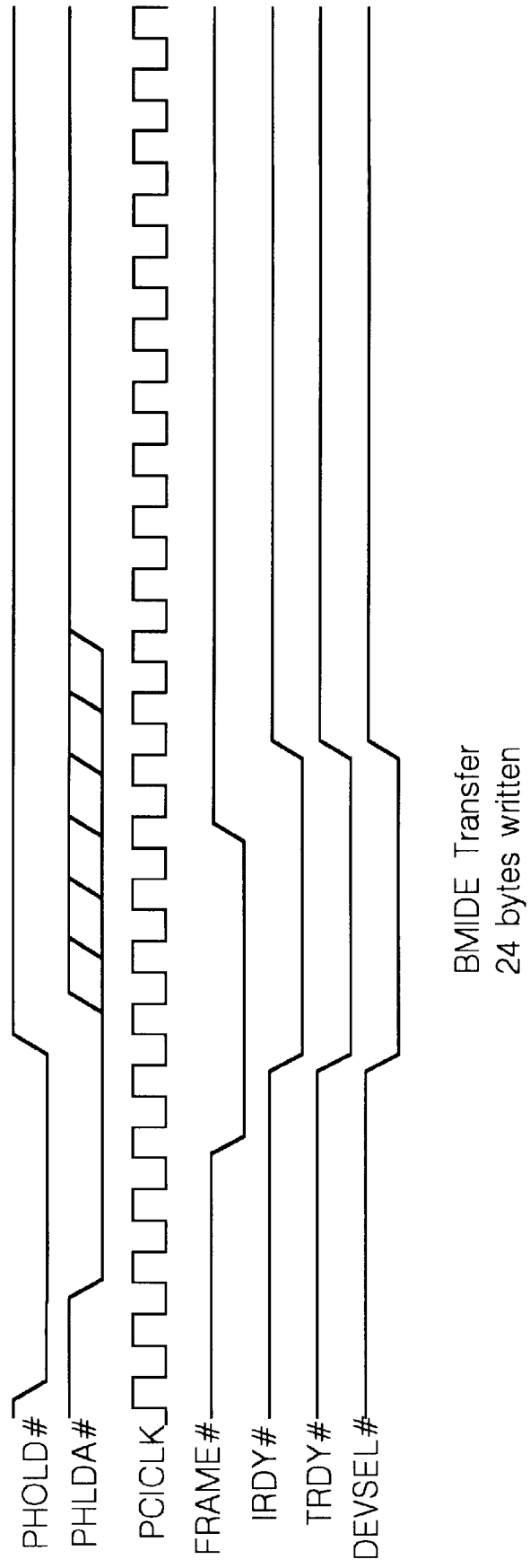
FIG. 8 illustrates a timing diagram example of the integrated expansion bus bridge controller controlling access by an IDE controller across a PCI bus that ends in an active release of the PCI bus.

In the example of FIG. 7, the expansion bus arbiter 630 was passively releasing the PCI bus to allow other devices to use the PCI bus. However, the PCI bus was passively released to prevent the CPU postings to or behind the expansion bus bridge since an ISA DMA transaction was in progress. However, if no ISA DMA is in progress, then the expansion bus arbiter 630 will actively release the PCI bus after each bus transaction by the USB controller or the IDE bus controller. FIG. 8 illustrates an example of the IDE bus controller transaction when no ISA DMA transaction is occurring.

Referring to FIG. 8, the expansion bus arbiter 630 asserts the PCI bus Hold (PHOLD#) signal since the IDE controller has requested access to the PCI bus. Eventually, the PCI bus Hold Acknowledge (PHLDA#) signal is asserted indicating that the expansion bus arbiter 630 has obtained control of the PCI bus. Assuming that the IDE controller has priority for the PCI bus and needs to make a PCI bus transaction, the IDE controller begins its PCI bus transaction by asserting the cycle Frame (FRAME#) signal.

Once the IDE controller begins its PCI bus transaction, the expansion bus arbiter 630 can release the PCI bus Hold (PHOLD#) signal. The IDE controller will retain control of the PCI bus until its transaction is completed. The IDE controller uses the cycle Frame (FRAME#), Initiator Ready (IRDY#), Target Ready (TRDY#), and Device Select (DEVSEL#), and other signal lines to complete its bus transaction according to the PCI bus protocol. Details on performing PCI bus transactions can be found in the "PCI Bus Specification" available from the PCI Special Interest Group (http://www.pcisig.com/). Since no ISA DMA transaction is in progress, the PCI bus Hold (PHOLD#) signal is released for at least two clock cycles such that an active release semantic is issued. The active release semantic allows CPU bus postings to occur.

The foregoing has described methods and apparatus for implementing an integrated bus controller. It is contemplated that changes and modifications may be made by one of ordinary skill in the art, to the materials and arrangements of elements of the present invention without departing from the scope of the invention.

I claim:

1. A computer system, said computer system comprising:
 a first bus, said first bus comprising a high speed computer bus;
 a first bus arbiter; and
 an expansion bus bridge, said expansion bus bridge coupled to said first bus and said first bus arbiter, said expansion bus bridge comprising
  a first expansion bus controller for controlling a first expansion bus coupled to said first bus,
  a second expansion bus controller for controlling a second expansion bus coupled to said first bus, and
  an expansion bus arbiter, said expansion bus arbiter arbitrating access between said first bus controller and said second bus controller to said first bus when said expansion bus bridge controls said first bus,
 wherein said expansion bus bridge passively releases said first bus after every bus transaction on said first bus when a direct memory access is being performed across said first bus by one of said expansion buses coupled to said expansion bus bridge.

2. The apparatus as claimed in claim 1 wherein said first bus comprises a Peripheral Component Interconnect (PCI) bus.

3. The apparatus as claimed in claim 1 wherein said first bus controller comprises an Industry Standard Architecture (ISA) bus controller.

4. The apparatus as claimed in claim 1 wherein said expansion bus bridge arbiter obtains control of said first bus by asserting a first computer bus hold signal.

5. The apparatus as claimed in claim 4 wherein said second bus controller comprises a Universal Serial Bus (USB) controller.

6. The apparatus as claimed in claim 1 wherein said expansion bus bridge executes an atomic bus transaction on said first bus for an expansion bus controller that wins arbitration.

7. The apparatus as claimed in claim 1 wherein said expansion bus arbiter comprises an arbitration state machine.

8. A computer system, said computer system comprising:
 a first bus, said first bus comprising a high speed computer bus;
 a first bus arbiter;
 an expansion arbiter, said expansion arbiter coupled to said first bus and said first bus arbiter, said expansion arbiter comprising
  a first agent that requests access to said first bus,
  a second agent that requests access to said first bus,
  arbitration logic, said arbitration logic arbitrating requests from said first agent and said second agent to determine a winning agent, and
  bus control logic, said bus control logic controlling access to said first bus by said winning agent when said expansion arbiter obtains control of said first bus,
 wherein said expansion bus control logic passively releases said first bus after every bus transaction on said first bus when a direct memory access is being performed across said first bus by first agent or said second agent coupled to said expansion arbiter.

9. The apparatus as claimed in claim 8 wherein said first bus comprises a Peripheral Component Interconnect (PCI) bus.

10. The apparatus as claimed in claim 9 wherein said first agent comprises an Industry Standard Architecture (ISA) bus controller.

11. The apparatus as claimed in claim 8 wherein said arbitration logic comprises an arbitration state machine.

12. The apparatus as claimed in claim 8 wherein said bus control logic executes an atomic bus transaction on said first bus for said winning agent.

13. The apparatus as claimed in claim 8 wherein said expansion arbiter obtains control of said first computer bus asserting a first computer bus hold signal.

14. The apparatus as claimed in claim 8 wherein said first agent comprises a Universal Serial Bus (USB) controller.

15. The apparatus as claimed in claim 11 wherein said arbitration state machine determines which agent has priority to access said first bus.

* * * * *